United States Patent [19]
Johnson

[11] 3,791,756
[45] Feb. 12, 1974

[54] TAPPING SPINDLE WITH TORQUE RELEASE CLUTCH BUILT INTO ITS SHANK AND HAVING AUTOMATIC DEPTH CONTROL

[75] Inventor: Allan S. Johnson, Newport Beach, Calif.

[73] Assignee: Tapmatic Corporation, Costa Mesa, Calif.

[22] Filed: Mar. 15, 1971

[21] Appl. No.: 124,020

[52] U.S. Cl............ 408/139, 408/14, 408/142, 408/239, 279/79, 279/97
[51] Int. Cl.............. B23b 47/24, B23b 31/04
[58] Field of Search........ 408/239, 238, 5, 139, 141, 408/142; 10/134, 135 R; 279/1 B, 97, 79, 14, 1 R

[56] References Cited
UNITED STATES PATENTS

| | | |
|---|---|---|
| 1,974,345 | 9/1934 | Scholtes..................... 10/135 R X |
| 2,527,517 | 10/1950 | Barker et al................. 10/135 R X |
| 2,764,416 | 9/1956 | Martin........................... 408/139 X |
| 2,540,937 | 2/1951 | Edens................................ 279/79 |
| 2,773,693 | 12/1956 | Chittenden..................... 279/97 X |
| 2,206,047 | 7/1940 | Poorman.......................... 408/139 |
| 3,002,206 | 10/1961 | Johnson........................... 408/139 |

Primary Examiner—Gil Weidenfeld
Attorney, Agent, or Firm—Herzig & Walsh

[57] ABSTRACT

A tapping spindle having a shank with a torque release clutch built into the shank so that the overall size is reduced adapting it for use in a machine carrying multiple closely spaced spindles. The clutch comprises a driving sleeve and a driven sleeve member, and is combined with an automatic depth control in the spindle. In one form the tapping spindle has a removable tool chuck holder having the torque release chuck built into it, the holder being rotatable relative to the spindle.

2 Claims, 13 Drawing Figures

PATENTED FEB 12 1974

INVENTOR.
ALLAN S. JOHNSON
BY Herzig & Walsh
ATTORNEYS

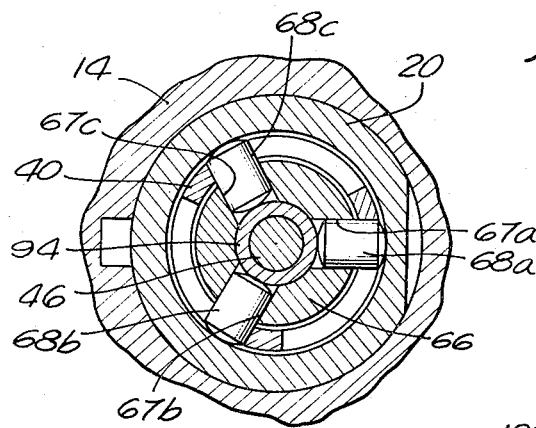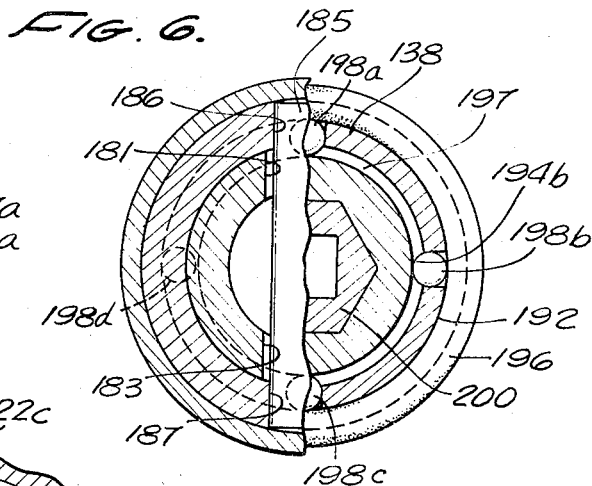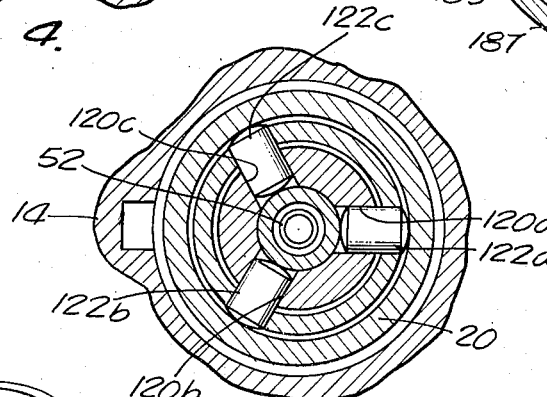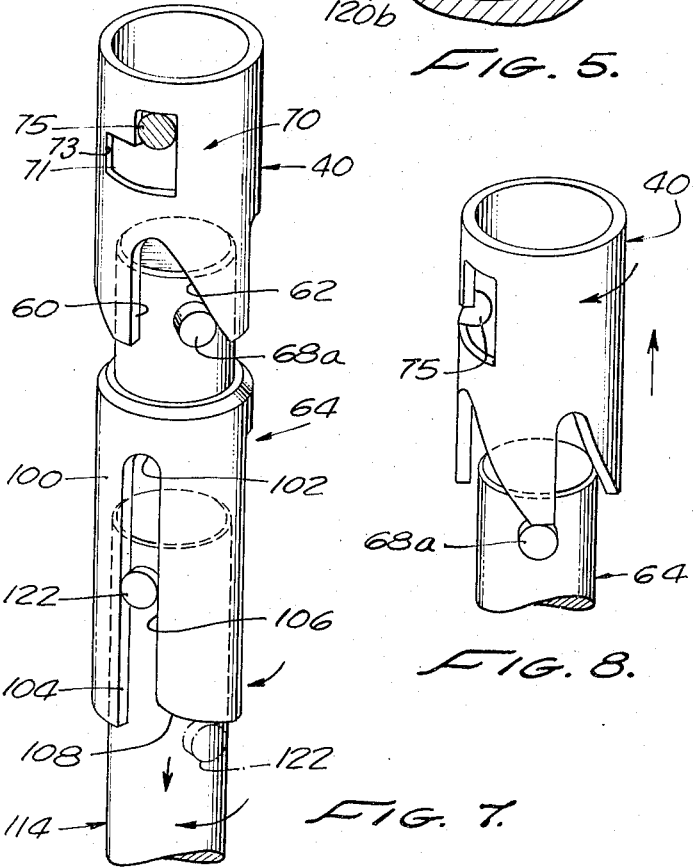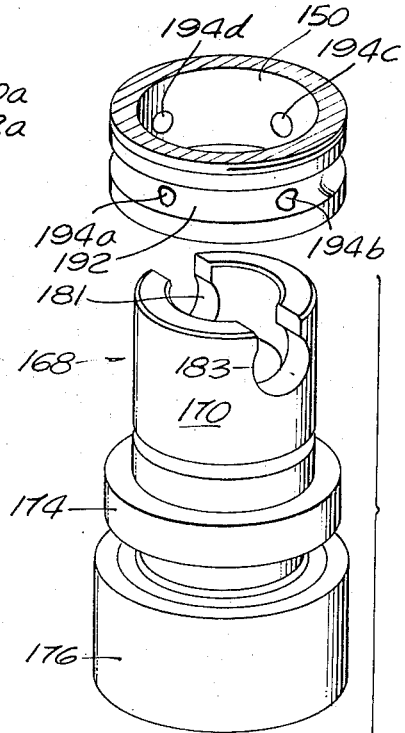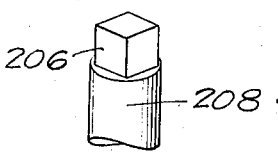

PATENTED FEB 12 1974

INVENTOR
ALLEN S. JOHNSON
BY
Herzig & Walsh
ATTORNEYS

TAPPING SPINDLE WITH TORQUE RELEASE CLUTCH BUILT INTO ITS SHANK AND HAVING AUTOMATIC DEPTH CONTROL

SUMMARY OF THE INVENTION

The invention is a tapping spindle, particularly adapted for use in machines having a head carrying multiple spindles such as for example, 20 spindles, all individually driven. With this type of machine, it is possible to drill or tap multiple holes in a work piece at the same time. It may be desirable to tap holes of different depths so that different spindles are adjusted to extend different amounts from the head. The spindle of the invention embodies an improved torque release clutch which is of small diameter and which is built into the spindle itself, thereby making it possible to have spindles closer together and to have more of them carried by the same head, for drilling or tapping multiple holes simultaneously.

Embodied in the spindle in combination with the improved clutch is an automatic depth control which causes the spindle to automaticaly declutch at the proper depth.

A preferred exemplary form of the invention is described in detail herein. Further specific improvements are included in the detailed description.

The primay object of the invention is to provide an improved spindle of a reduced diameter wherein a torque release clutch is embodied within the spindle itself combined with depth control means adapted to declutch at a desired predetermined depth.

A further object is to provide an improved torque release clutch of reduced diameter embodying a sleeve having a skirt cooperable with drive pins and with a drive pin for driving the sleeve cooperating with a slot in the sleeve whereby to hold the sleeve out of driving position upon release of the clutch.

A further object is to provide a torque release clutch as in the foregoing built into the shank of a tapping spindle and combined with a depth control mechanism in the shank.

A further object resides in the provision of an improved quick change collet chuck, embodying a replaceable hex jaw whereby hex jaws may be provided in sets having different size square holes adapted for different sizes of tapping tools making it unnecessary to have different sizes of collet chucks and nuts.

A further object is to provide an improved tapping spindle having a quick change chuck assembly with the torque release clutch built into the quick change assembly so that when a change is made for different tools, the setting of the torque release clutch clutch can be changed without removing the tool from the machine.

BRIEF DESCRIPTION OF THE DRAWINGS

Further objects and additional advantages of the invention will become apparent from the following detailed description and annexed drawings wherein:

FIG.4 is a cross sectional view taken along the line 4—4 of FIG. 2;

FIG. 5 is a cross sectional view taken along the line 5—5 of FIG. 2;

FIG. 6 is a cross sectional view taken along the line 6—6 of FIG. 2;

FIG. 7 is a perspective view of the combined torque release clutch and automatic depth control mechanism;

FIG. 8 is a perspective view showing the torque release clutch in a second position; and FIG. 9 is an exploded view of the quick change chuck or tool holder embodied in the spindle.

DESCRIPTION OF THE PREFERRED EMBODIMENT

Referring now in more detail to the various figures of the drawings, numeral 10 designates a head of a machine adapted to carry multiple, closely spaced spindles, each one of which is individually gear driven. Numeral 12 designates schematically the improved spindle of the invention, different parts of which will be described in detail in connection with the various figures herein.

Figure 1:
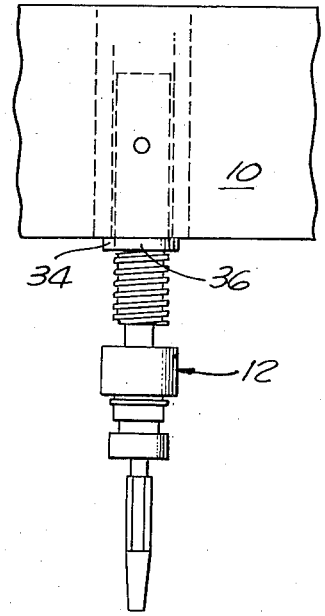
FIG. 1 is a schematic view illustrating an installation of one of the tapping spindles of the invention.
Figure 2:
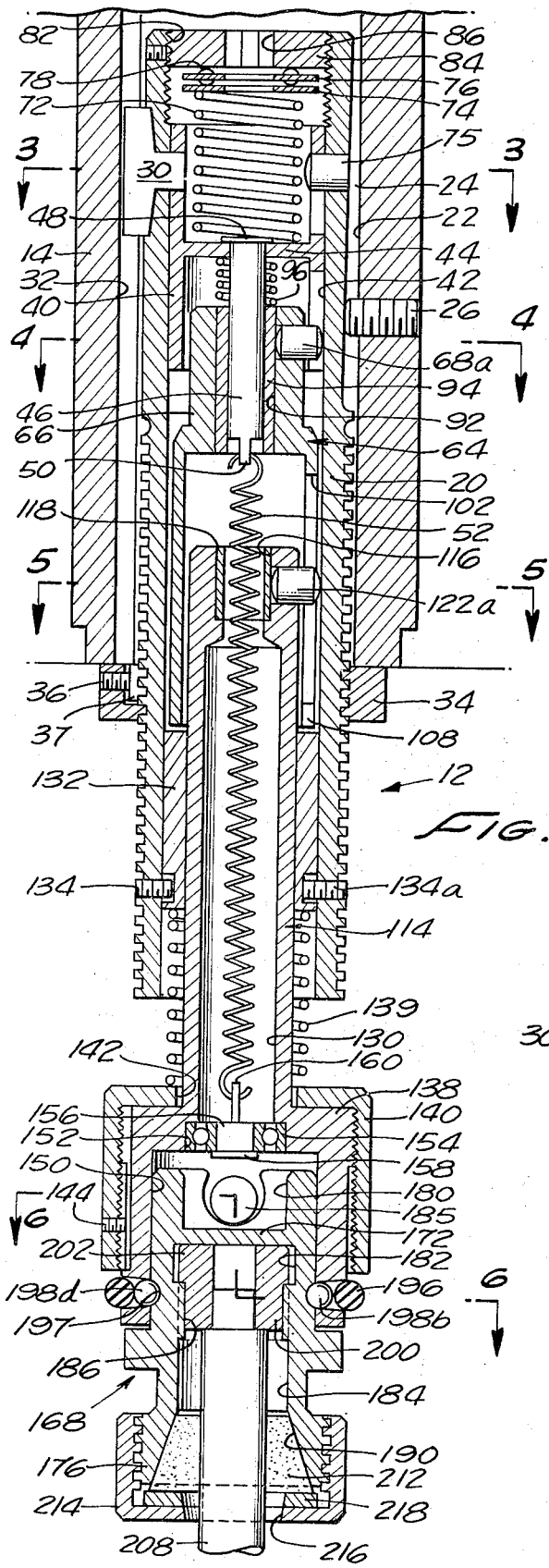
FIG. 2 is a cross sectional view of a preferred form of the tapping spindle of the invention.

Head 10 has rotatable stems forming receptacles to receive the shanks of individual tapping spindles which are secured in the receptacles in desired positions. In FIG. 2, numeral 14 designates a stem which is within the head 10 and which is driven and which forms a receptacle to receive the spindle 12. The spindle has the cylindrical shank member 20, the upper part of which is received in the bore 22 of the cylindrical stem 14. The shank member 20 has a milled tapered flat 24, and it is held in position by a set screw 26 which engages against the flat, and by which the amount of insertion is fixed.

Numeral 30 designates a Woodruff key which is fitted into an opening in the opposite side of the shank member 20 and which moves in an axial groove 32 on the inside of the tubular stem 14.

The lower part of the member 20 is threaded as shown. Numeral 34 designates a threaded collar which fits onto the threaded part of the member and which engages against the lower end of the tubular stem 14. It may be set in position by way of set screw 36, engaging shoe 37.

The Torque Release Clutch

Figure 3:
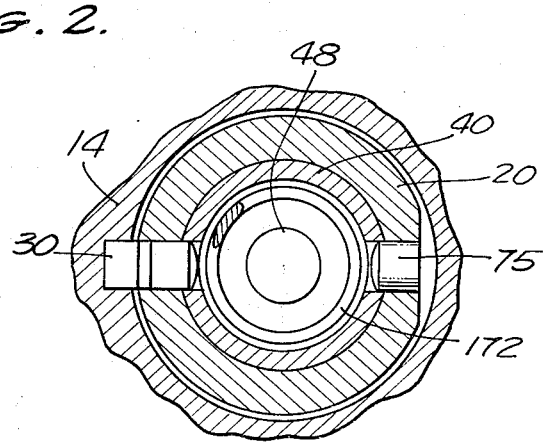
FIG. 3 is a cross sectional view taken along the line 3—3 of FIG. 2.

The torque release clutch is of relatively small diameter and it is built into the shank 20 of the spindle assembly. It is shown in detail in the upper part of FIG. 2, in the cross sectional views FIGS. 3 and 4, and in FIGS. 7 and 8.

The torque release clutch is an improvement on the torque release clutch of U.S. Pat. No. 3,472,347. It embodies a tubular member or sleeve 40 which fits within bore 42 within the shank member 20. At an intermediate part of the sleeve member 40, there is a transverse septum or partition 44 having a central bore through which extends the cylindrical stem 46 having a head 48 and at the lower end of which there is a lug 50 to which is secured suspension spring 52. The spindle of the invention is of a type having free axial float as described in previous patents such as the one referred to above and also U.S. Pat. No. 3,397,588.

The lower end of sleeve 40 is formed to have a group or plurality of cut outs as may be seen in FIGS. 7 and 8, the cut outs having one axial side as designated at 60 and a slanting or angular side as designated at 62. Numeral 64 designates a driven sleeve member which is the depth control member, the upper cylincrical part of which is designated at 66 and which is within the skirt at the lower part of the sleeve 40. In the part 66, there are three radial bores 67a, 67b, and 67c in which are radial pins 68a, 68b and 68c which are received in the group of cut outs in the lower end or skirt of the sleeve 40 as previously described in connection with FIG. 7. The member 64 is driven by the sleeve member 40 as will be observed by way of the pins 68a, 68b, and 68c, engaging in the cut outs. The slanting surface 62 of sleeve 40 engages pins such as 68a as may be seen in FIG. 7 to drive part 64. The torque tends to force the sleeve 40 upwardly.

In the side wall of the upper part of the sleeve 40 is a right angle slot 70 having an axial part 71 and a circumferentially extending part 73. Numeral 75 designates a radial pin fitted in a bore in a side wall of the upper part of the shank 20 and this pin engages in the right angle slot 70 for a purpose which will be described presently.

Numeral 72 designates a coil spring, the lower end of which fits within the upper part of sleeve 40 against the partition or septum 44. The upper end of spring 72 engages disc 74 of a thrust bearing which embodies a second disc 76 carrying angularly spaced balls 78 that ride against the disc 74. The upper end of the member 20 is internally threaded, as designated at 82 and received within the threaded bore is an end cap 84 having a center opening 86 adapted to receive a wrench for adjusting the end cap to thereby adjust the force exerted by spring 72 against the thrust bearing. The torque release clutch is of course responsive to the amount of driving torque and the predetermined torque at which the clutch will release is determined by the setting of the end cap member 84 which determines the bias of the spring 72 and thus the amount of pressure exerted on the sleeve 40 which will cause it to move up and disengage from the pins 68, as described more in detail hereinafter.

The operation of the torque release clutch will be readily understood from the foregoing. At a predetermined torque determined by the setting of the bias spring 72, the force exerted by the slanting surfaces 62 causes the sleeve 40 to move upwardly against the spring 72 and disengage from the pins 68. Such position of sleeve 40 is illustrated in FIG. 8, in which position the pin 75 has moved from the axial part of the right angle slot 71 into the circumferential part 73 as shown; and in this position, it holds the sleeve 40 lifted as shown in FIG. 8 in which position the drive has been released and no torque is transmitted. In the event of reversal of rotation of the direction of the drive, the sleeve 40 will be rotated in a direction opposite to the direction of the arrow of FIG. 8 which will cause the radial pin 75 to be moved relatively to the axial part 71 of the right angle slot, allowing the sleeve 20 to drop down so that the pins 68 again move into the cut outs and into engagement with the axial edges or surfaces 60 of the cut outs to provide for positive reverse drive.

When the clutch releases sleeve 40 moves angularly; the thrust bearing allows the end of spring 72 to freely rotate without twisting.

The torque release clutch is of simplified form and is of small diameter and is built into the shank of the spindle to thereby reduce its diameter. As previously pointed out, the torque release clutch which will release at a predetermined torque is combined with an automatic depth control.

Automatic Depth Control

The automatic depth control embodies the driven sleeve member 64 already referred to. Upper part 66 has a bore 92 in which is a bushing 94 through which the stem 46 extends, there being a coil spring 96 around the stem 46 between the upper end of the driven member 64 and the septum 44. The driven member 64 releases upon an upward axial movement against the force of spring 96 as will be described. At the lower end of member 64 it has a skirt part 100 having an axial slot 102 as shown in FIG. 7. Referring to the slot 102 shown in FIG. 7, it has a straight side 104 and another side 106 at the lower end of which is rounded or contoured off as shown at 108. Numeral 114 designates the driven spindle at the upper part of which is a bore 116 having in it a bushing 118, spring 52 passing through this bushing. At the upper end of the spindle stem 114 there are three radial bores 120a, 120b, and 120c in which are radial pins 122a, 122b, and 122c which are received in the axial slots like the slot 102 of FIG. 7. See FIG. 5.

From the foregoing, the operation of the automatic depth control will be readily understood. As tapping progresses, the pins 122 will move downwardly in the vertical slots 102. When they reach the curved or contoured edges 108, the pins will underride the lower end of the skirt 100 causing the driven sleeve 64 to move upwardly, that is axially against the force of spring 96 so that the driving connection is released and tapping will be stopped. This will occur without chattering or binding.

Quick Change Chuck and Driven Spindle Stem

The spindle stem 114 has a main bore 130, the bore 116 being a counterbore. These two bores are connected by a taper as shown. The spindle stem 114 is journalled in a bushing 132 which is in the lower end part of the cylindrical shank 20 and it may be set in position by way of a set screw 134. The lower end of the spindle stem 114 is enlarged as designated at 138, this part being externally threaded as shown and there being a threaded cap 140 engaged on it, the cap having a bore 142 through which the stem 114 extends. Numeral 144 designates a set screw whereby the position of the cap 140 can be fixed. Numeral 139 designates a relatively heavy spring between bushing 132 and part 138. In a multiple spindle machine if a bit should come down on a work piece where no hole had been drilled, no breakage would occur since the tool holder can push up against this spring. The part 138 has a bore 150 with a smaller counterbore 152. Fitting in the counterbore 152 is a bearing 154 within in which is a short stem 156 having a head 158 and a lug 160 to which is attached the lower end of the spring 52.

Numeral 168 designates the quick change chuck assembly which is shown in more detail in FIGS. 6 and 9. The quick change assembly comprises a sleeve member 170 which fits into the bore 150 in the part 138. Sleeve 170 has a transverse partition or septum 172 as shown. It has an intermediate flange 174 and an enlarged threaded boss 176 at its lower end. At its upper end, it has a bore 180. It also has bores 182 and 184 of the same diameter with a bore 186 in between these two of slightly smaller diameter and it has tapered end bore 190.

In the upper end of sleeve 170 in the sides thereof are formed arcuate grooves or cut outs as designated at 181 and 183. See FIGS. 6 and 9. Numeral 185 designates a transverse pin that is received in these cut outs and the ends of which are received in diametrically opposite radial bores in the part 138 as designated at 186 and 187. The part 138 of the spindle stem drives the quick change chuck assembly by way of the pin or shaft 185 and the cut outs 186 and 187. As will be observed, these cut outs extend through an angle of more than 180 degrees so that the entrance to these cut outs subtends an angle of less than 180 degrees. When torque is being applied, the ends of the shaft or stem 185 move against a side of each of the cut outs and then the extending lip or shoulder at the entrance to the cut out prevents axial pull-out of the pin or shaft 185 and thus prevents the quick change chuck assembly from being pulled out while being driven, the neophrene ring 186 having only enough holding force to hold the quick change assembly in position when not loaded, as will be described.

At the lower end of part 138 on opposite sides, there is an arcuate annular groove as shown at 192 and there are four equal spaced radial bores 194a, b, c, and d which intersect with the bore 150. Numeral 196 designates a flexible neoprene ring which fits around the lower end of part 138 and into the arcuate groove 192 to engage against steel balls 198a, b, c, and d in the radial bore whereby to urge them inwardly into annular groove 197 in the wall of the sleeve part 170 to hold the quick change assembly in position.

Numeral 200 designates a hex jaw, the upper part of which is hexagonal being broached into the bore 182, the lower part of which fits into the bore 186 of smaller diameter. the hex jaw has a square center hole 201 to receive the square end 206 of a tool as designated at 208 in FIG. 9. The hex jaw 200 is itself replaceable, there being a set of these hex jaws each having a different size square hole adapting it to taps of different sizes. Thus, for different size taps, only this hex jaw need be replaced rather than replacing the complete collet assembly. Since the hex jaws are interchangeable, the chucks may be of the same size, the only difference in the hex jaws being the different size square holes in them.

The chuck assembly may otherwise be conventional and may be like that shown in U.S. Pat. No. 3,472,347. A plurality of tapered collet jaws 212 are positioned within the tapered bore 190 and are held in upward position by threaded collet cap 214 which threads on to the boss 176 and having a bore 216 through which the tool 208 passes, Numeral 218 designates a washer that engages against the collet jaws 212.

SUMMARY OF OPERATION

From the foregoing description of the component parts, those skilled in the art will readily understand the overall operation. The tool is set in the collet as described, and the quick change assembly is fitted into the end part 138 of the driven spindle. The threaded cap 140 may be set in a desired position and screw 144 set up. An adjustment of the cap 84 adjusts the tension at which the clutch will release as described in the foregoing. The depth control will release at the desired depth control setting. This is determined by the setting of the shank 20 within the stem 14 as described.

Modifications of FIGS. 10 through 13

FIGS. 10 through 13 of the drawings illustrate a modified form of the invention embodying certain additional improvements. One of these is that the torque release clutch is built into the quick change chuck assembly to realize advantages as already set forth. The collet check is part of a fitting that carries the hex jaw and this fitting itself is relatively rotatable with respect to the quick change chuck assembly for reasons which will be made clear. The retaining feature for holding the quick change chuck assembly in position under load is slightly modified, as will be explained.

Those parts of the modification of FIGS. 10 through 13 which correspond closely to similar parts of the previous embodiment are identified by the same reference characters primed; and to the extent that the description of the previous embodiment applies to this one, the description will not be repeated.

Figure 10:
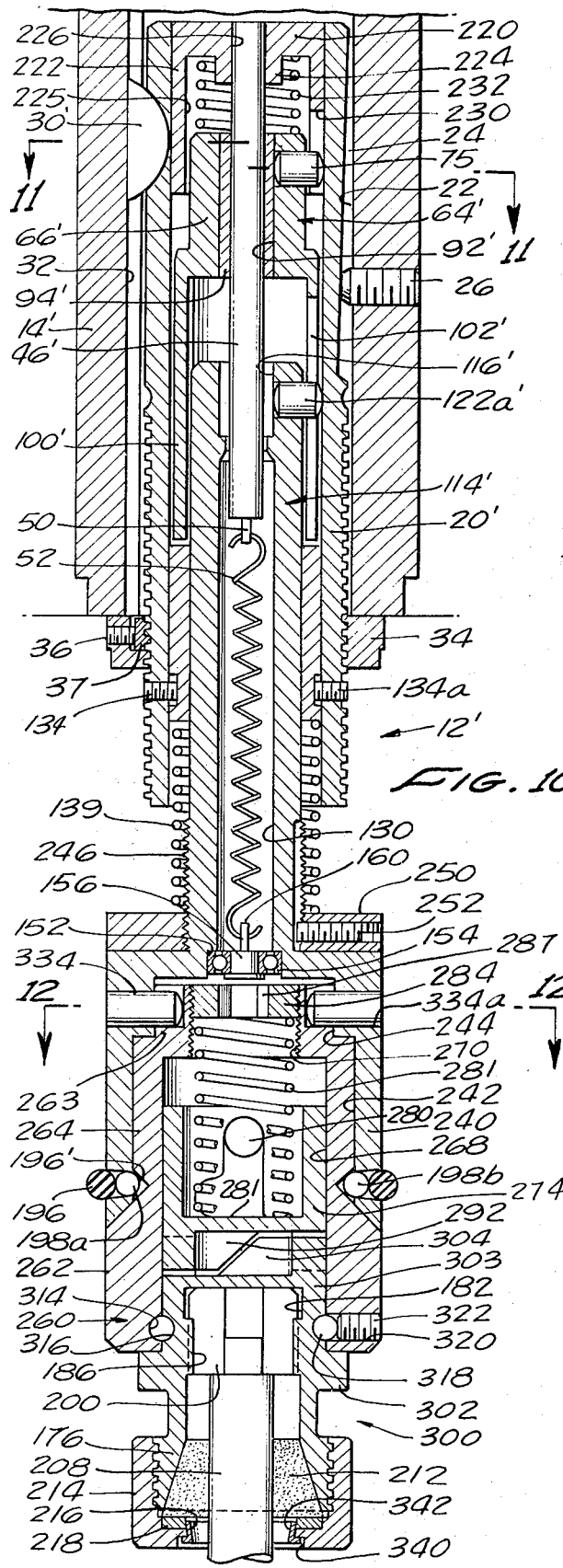
FIG. 10 is a cross sectional view of a modified form of tapping spindle.
Figure 11:
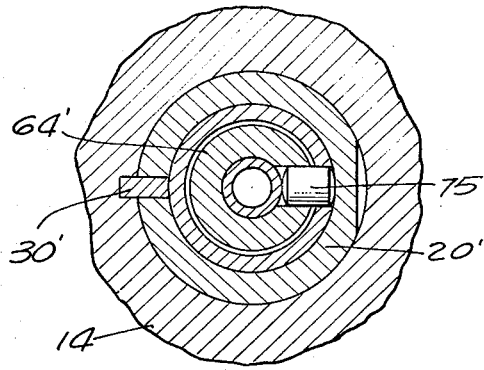
FIG. 11 is a cross sectional view taken along line 11—11 of FIG. 10.
Figure 12:
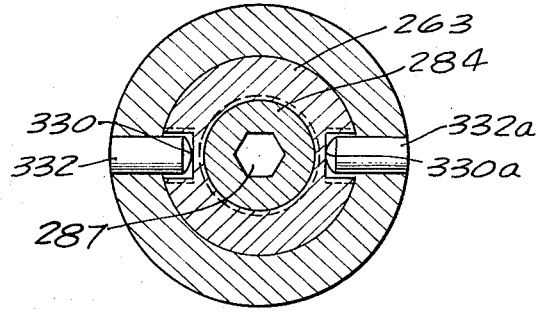
FIG. 12 is a cross sectional view taken along line 12—12 of FIG. 10.

As may be observed, in FIG. 10, the torque release clutch is at the lower part of the figure within the quick change chuck assembly. The depth control mechanism is very similar to that of the previous embodiment. The shank 20' is guided in the stem 14 by the arcuate piece 30 which fits into a recess on the side of the shank 25 and moves in axial slot 32. Fitting in the upper end of the shank 25 is a plug 220 having a depending skirt 222 and an extending boss 224. It has a bore 225 and a counter bore 226. As may be seen, the stem 46' extends through the end fitting or plug 220 through the bushing in the upper part of the driven sleeve 64' and through the upper part of the driven spindle member 114', this spindle stem being similar to that of the previous embodiment; but because of its length, greater assurance of concentricity is provided. The skirt 222 has a side cut-out 230 in which the radial pin 75 engages. Numeral 232 designates a biasing spring biasing the upper end of the driven sleeve 64' and the end fitting 220 and the boss 224 serving as a spring retainer.

The depth control mechanism operates like that of the previous embodiment, and it is not necessary to describe this operation again. It may be pointed out, however, that on release at the set depth, driven sleeve 64' moves upwardly against the spring 232 with the pin 75 moving in the slot or cut-out 230.

The lower end of the spindle stem 114' is enlarged and cup-shaped as designated at 240, having a bore 242, counter bore 244, in addition to the counter bore 152 that receives the bearing 154 like the one previously described. The spindle stem 114' is threaded as designated at 246 and threaded to it is an internally threaded disc 250 which may be set in position by a set screw 252. Disc 250 may be adjusted against the tension of spring 139 and the effect of which is to adjust the point of automatic depth control release.

Figure 13:
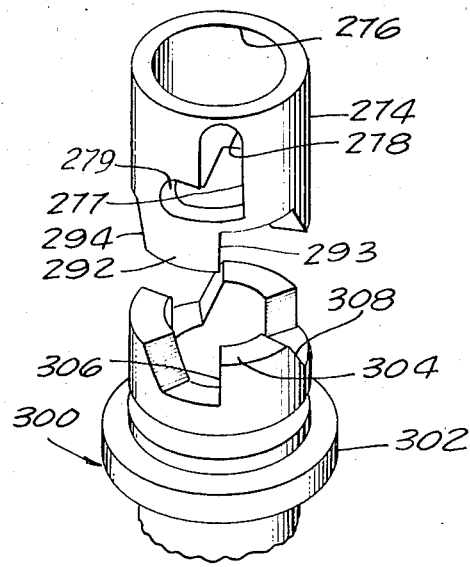
FIG. 13 is a perspective view of the torque release clutch of FIG. 10.

The quick-change chuck assembly is designated generally at 260. It comprises the sleeve 262, the upper parts of which as designated at 263 and 264 fit into the counter-bores 244 and 242 respectively in the part 240. The sleeve 262 has a bore 268 and a threaded counter-bore 270. The torque release clutch is built in to the sleeve member 262 which is removable in a manner similar to that of the previous embodiment not requiring further description. The parts of the torque release clutch are shown in FIG. 13. These parts comprise a sleeve 274 having a bore 276 which fits into the bore 268 in the sleeve 262. The sleeve 274 has two diametrically opposed cut-outs, one of which is designated at 277, having an axial part 278 and circumferential part 279, this cut-out corresponding to the cut-out 70 of the previous embodiment. Pin 280 extends diametrically so that its end parts can be received in the cut-outs. Numeral 281 designates a coil spring that fits inside of the sleeve 274 which has a bottom 281 and the other end of the spring bearing against threaded ring 284 which threads into the threaded counter-bore 270 in the upper end of the sleeve 262. This ring has square center opening 287 adapted to receive a wrench for adjustment to adjust the tension on the spring 281 to thereby adjust the magnitude of the torque at which the torque-release clutch will release.

At the lower end of the clutch sleeve 274 there are three extending lugs as shown at 292 in FIG. 13, each having one axial surface as designated at 293 and a beveled surface as designated at 294, with angularly spaced gaps in between the lugs.

Numeral 300 designates generally a sleeve or fitting which forms the collet chuck holder and which is relatively rotatable with respect to the sleeve 262 and which carries the mating parts of the clutch. The lower part of the holder 300 is like that of the previous embodiment. It has an intermediate flange 302 and an upper part 303 which is received in the bore 268 and this part has three extending lugs, one of which is designated at 304 in FIG. 13, each having one axial surface 306 and beveled surface 308 like the corresponding surfaces on the lugs of the clutch sleeve 274. These lugs are similarly oppositely configurated with similar angularly spaced gaps in between them.

The lower end of the bore 268 in the sleeve 262 has an annular groove of semi-circular cross-section in it as designated at 314 and the upper part of the holder 300 has a similar groove 316 in it, so that a ring-shaped opening is formed which is normally filled or loaded with ball bearings as designated at 318, which may be loaded in through a radial bore 320, which is then closed with screw 322. Thus, these balls provide a bearing enabling the chuck holder to freely rotate with respect to the assembly 260.

The torque release clutch shown in FIG. 13 operates similarly to the torque release clutch of the previous embodiment. At a predetermined set torque the action of the beveled surfaces of the lugs on the clutch sleeve 274 and on the holder 300 will cause the clutch sleeve 274 to move axially against the force of spring 281 to cause the diametrical pin 280 to move down into the circumferential parts 279 of the cut-outs in clutch sleeve 274 and thus to hold the clutch sleeve in an upward disengaged position until the direction of rotation is reversed, at which time the clutch will reengage for operation in the reverse direction.

The quick-change assembly is held into the part 240 in a manner similar to that of the previous embodiment. In this form also when the tapping spindle is under load, the torque acts to prevent the quick-change assembly from coming out. In the upper part 263 of the sleeve 262 there are diametrically opposed recesses or cut-outs as may be seen at 330 and 330a in FIG. 12. These recesses or cut-outs are configurated like the cut-outs 181 and 183 of the previous embodiment so that the openings into them is less than their diameter or width so that a lip is formed at the side of the entrance opening to the cut-outs.

Numerals 332 and 332a designate radial pins received in diametrically opposite radial bores 334 and 334a in the part 240, the ends of these stems engaging in the cut-outs 330 and 330a. Thus, it may be seen that when the tapping spindle is under load the torque causes the pins 332 and 332a to be forced against the sides of the cut-outs in which they engage, so that the lips at the entrances to the cut-outs overhand the pins and prevent the quick-change assembly from pulling out.

The collet chuck itself is like that of the previous embodiment. However, in the neck 214 an additional counter-bore 340 is provided and in the bore 216 and the counter-bore 340 there is provided a washer or ring member 342 having a flange received in the counter-bore 340.

The operation of the components of the embodiment of FIGS. 10-13 has been described in connection with the description of their construction and will be readily understood, particularly in the light of the description of operation of the previous embodiment. The additional advantages of this embodiment will be readily apparent to those skilled in the art and as summarized in the foregoing. The tool need not be removed from the machine in order to change the setting of the torque release clutch which is removed with the quick-change assembly. In this assembly the hex jaw construction is like that of the previous embodiment. The position of automatic depth control release is similarly set.

From the foregoing those skilled in the art will fully understand the nature and construction of the invention and the manner in which it achieves and realizes all of the objectives and advantages as set forth in the foregoing.

The foregoing disclosure is representative of a preferred form of the invention and is to be interpreted in an illustrative rather than in a limiting sense, the invention to be accorded the full scope of the claims appended hereto.

What is claimed is:

1. A tapping spindle having a shank part adapted to be received in a machine, said tapping spindle having a stem with a receptacle at one end for carrying a modular tool holder assembly, said assembly including a tool holder, releasable means for holding the tool holder assembly in the receptacle and constructed to hold the assembly by friction for quick removal and for quick change of the tool holder, the modular tool holder having a torque release clutch built into it with means for adjusting the magnitude of the torque at which the clutch will release so that the release torque can be adjusted whenever the modular tool holder assembly is removed.

2. A tapping spindle as in claim 1 wherein said tool holder assembly comprises a body part adapted to be received in the receptacle and a relatively rotatable sleeve part carried by the body part, and a collet chuck for holding a tool carried by the sleeve part.

* * * * *